United States Patent [19]

Bennett

[11] Patent Number: 5,088,337

[45] Date of Patent: Feb. 18, 1992

[54] PROBE HEAD

[75] Inventor: Simon J. Bennett, Painswick, United Kingdom

[73] Assignee: Renishaw plc, Gloucestershire, United Kingdom

[21] Appl. No.: 752,924

[22] Filed: Aug. 30, 1991

Related U.S. Application Data

[63] Continuation of Ser. No. 497,654, Mar. 23, 1990, abandoned.

[30] Foreign Application Priority Data

Apr. 14, 1989 [GB] United Kingdom ................. 8908537
Dec. 2, 1989 [GB] United Kingdom ................. 8927312

[51] Int. Cl.$^5$ .................................................. G01B 7/02
[52] U.S. Cl. ....................................... 73/866.5; 33/572
[58] Field of Search ............................... 73/866.5, 865.8; 33/503, 559–561, 572, 832, 833, 838

[56] References Cited

U.S. PATENT DOCUMENTS

| | | |
|---|---|---|
| 2,144,972 | 1/1939 | Hirst . |
| 2,834,842 | 5/1958 | LeBeau . |
| 3,024,334 | 3/1962 | Rhodes . |
| 3,277,789 | 10/1966 | Graham . |
| 4,168,576 | 9/1979 | McMurtry . |
| 4,289,382 | 9/1981 | Clark . |
| 4,313,263 | 2/1982 | McMurtry . |
| 4,451,988 | 6/1984 | McMurtry . |
| 4,527,023 | 7/1985 | Ohashi et al. . |
| 4,549,359 | 10/1985 | Hense et al. . |
| 4,571,847 | 2/1986 | McMurtry . |
| 4,859,817 | 8/1989 | Cassani . |
| 4,888,877 | 12/1989 | Enderle et al. . |
| 4,941,266 | 7/1990 | Bissegger et al. ................ 33/559 |

FOREIGN PATENT DOCUMENTS

| | | |
|---|---|---|
| 0317967 | 5/1989 | European Pat. Off. . |
| 3712249 | 10/1988 | Fed. Rep. of Germany . |
| 1544088 | 9/1968 | France . |
| 59-126910A | 7/1984 | Japan . |
| 61-204502 | 9/1986 | Japan . |
| 62-142210A | 6/1987 | Japan . |
| WO85/02138 | 5/1985 | PCT Int'l Appl. . |
| 2037436 | 4/1983 | United Kingdom . |
| 2136574A | 9/1984 | United Kingdom . |
| 2139357 | 11/1984 | United Kingdom . |
| 2147422A | 5/1985 | United Kingdom . |
| 2172707A | 9/1986 | United Kingdom . |

OTHER PUBLICATIONS

Product Description for Renishaw Motorised Probe Head, PH9, 9A and 10M.
Renishaw, "Two Axis Index Head PH8" brochure; Renishaw PH9 Automated Inspection System for Measuring Machines brochure; Renault brochure; photographs of a DEA head and a Mitutoyo head.

Primary Examiner—Robert Raevis
Attorney, Agent, or Firm—Oliff & Berridge

[57] ABSTRACT

A manually operable probe head (10) has a support (12), by which the probe head may be attached to the head of a coordinate measuring machine, a first rotor (14) rotatable about an axis (16) relative to the support (12), and a second rotor (46) rotatable relative to the first rotor about a perpendicular axis (48). The first rotor (14) and second rotor (46) are each rotatable through a plurality of kinematic rest positions, into which they may be axially urged through retraction of a tie bar (90). Location of the first and second rotors when not in their rest positions is achieved by three spring loaded pistons (34) and (72). The pistons (34) and (72) ensure that even when not in their rest positions, the first and second rotors always come to rest adjacent such a position. The second rotor (46) carries a connector (54) for receiving a touch probe (50). The connector (54) is recessed within the probe head in a bore (52), behind the axis (48), and this provides a smaller reduction in the operating envelope of the machine (caused by the use of the probe head (10) in connecting the probe to the machine).

8 Claims, 3 Drawing Sheets

PROBE HEAD

This is a continuation of application Ser. No. 07/497,654 filed Mar. 23, 1990, now abandoned.

BACKGROUND OF THE INVENTION

The invention relates to a probe head which may be used, for example, to orientate a probe mounted to a head of a coordinate positioning machine.

FIELD OF THE INVENTION

Typically, a known probe head has two rotors, which rotate about mutually perpendicular axes. One of the rotors is mounted for rotation with and relative to a support by which the probe head may be connected to the head of a coordinate positioning machine (such as a coordinate measuring machine or machine tool). The other of the rotors is in turn mounted to the first rotor for rotation about a perpendicular axis, and carries a probe for sensing a workpiece. Thus, the probe head can be used to orientate the probe in any desired direction relative to a workpiece, and measurement of workpieces of complex shape is thus facilitated. However, because the probe is mounted to the head of the machine via the probe head, rather than directly to the head, the use of a probe head on a coordinate positioning machine inevitably results in a reduction in the size of the operating envelope of the machine.

SUMMARY OF THE INVENTION

A first aspect of the present invention provides a probe head for orientating probe relative to a head of a coordinate positioning machine, comprising:
- a support for connecting the probe head to the head of the machine;
- a first rotor mounted to the support, and for rotation relative to the support about a first axis;
- a second rotor mounted to the first rotor for rotation with the first rotor about the first axis, and for rotation relative to the first rotor about a second axis, the second axis being substantially perpendicular to the first axis;
- the second rotor having a connector for receiving a probe, the probe having an axis; wherein
- when the relative orientation of the first and second rotor is such that a said probe has its axis parallel to the first axis, the distance between the connector and the support is smaller than the distance between the second axis and the support.

A second aspect of the present invention consists in recessing at least the joint between the probe and the probe head within the probe head. In a preferred embodiment, at least a part of the probe itself is also recessed.

Accordingly a second aspect of the present invention provides a probe head for orientating a probe relative to a head of a coordinate positioning machine, comprising:
- a support for connecting the probe head to the head of the machine;
- a first rotor mounted to the support, and for rotation relative to the support about a first axis;
- a second rotor mounted to the first rotor for rotation with the first rotor about the first axis, and for rotation relative to the first rotor about a second axis, the second axis being non-parallel to the first axis;
- the second rotor carrying a connector for receiving a probe, the connector being recessed within the probe head in a bore for housing the probe.

Preferably, the or each rotor is mounted for seating in, and rotation between a plurality of rest locations.

A third aspect of the present invention provides a probe head for orientating a touch probe relative to a head of a coordinate positioning machine, comprising:
- a support for connecting the probe head to the head of the machine;
- a first rotor mounted to the support, and for rotation relative to the support about a first axis;
- a connector provided on the first rotor for receiving a probe;
- the first rotor being mounted to the support for seating in, and rotation between a plurality of repeatable rest locations;
- means for axially engaging the first rotor, into its rest position and axially disengaging the first rotor out of its rest position, thereby to permit said relative rotation of the support and the first rotor; and
- means for locating the first rotor relative to the support when the first rotor and support are disengaged.

Preferably the plurality of rest locations will be provided by:
- at least six pairs of convergent surfaces situated substantially on the circumference of a circle and provided on one of the first rotor and support; and
- three members provided on the other of the first rotor and support, and each positioned for seating in a pair of the convergent surfaces, thereby to provide a kinematic location of first rotor and support.

Preferably the locating means will be provided by:
- three locating members provided on the other of the first rotor and support for seating in a further a pair of convergent surfaces; and
- means for axially biasing the locating members into seating with the further pairs of convergent surfaces, thereby to enable axial displacement of the locating members by the convergent surfaces as a consequence of relative rotation of the first rotor and support.

Preferably the socket is mounted on the first rotor via a second rotor, mounted for rotation with the first rotor, and for rotation relative to the first rotor about a second axis, non-parallel to the first axis.

Preferably the probe head will be provided with means for determining the relative position of e.g., the first rotor and support, and displaying this on the body of the probe head.

BRIEF DESCRIPTION OF DRAWINGS

An embodiment of the invention will now be described, by way of example, and with reference to the accompanying drawings in which.

DESCRIPTION OF PREFERRED EMBODIMENTS

Figure 1:
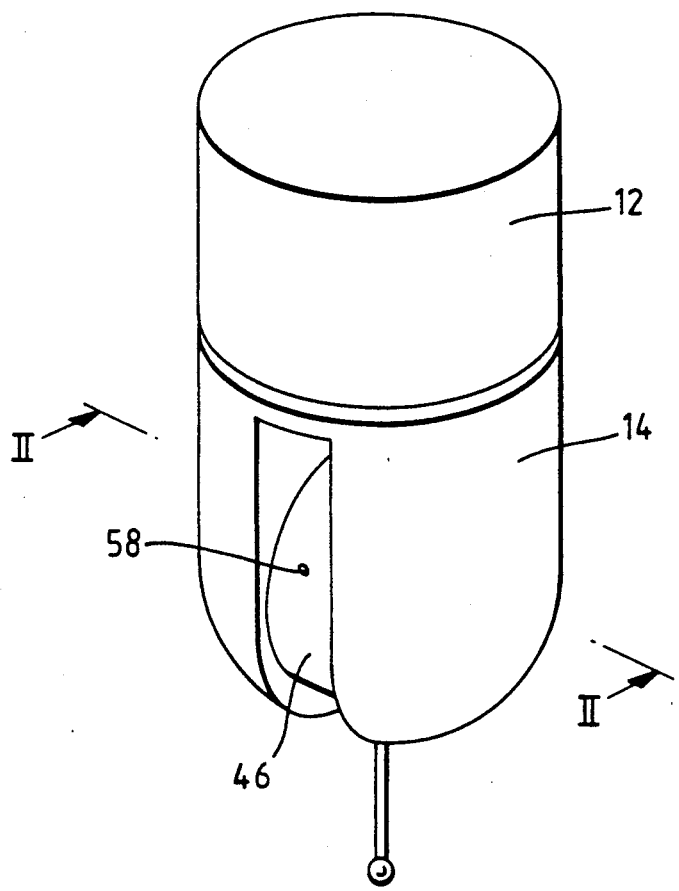
FIG. 1 is a perspective view of a probe head according to the present invention.

Referring to FIGS. 1 to 4, a probe head has a cylindrical support 12 and a dome shaped rotor 14, mounted for rotation relative to the support 12. The probe head may be mounted to the quill of a coordinate measuring machine via the support 12. The rotor 14 is mounted for rotation relative to the support 12 about an axis 16 of a hollow shaft 18, which projects through an aperture 20 (defined by annular lip 22) in the base of the support 12, into a cavity 24 in the body of the support 12.

A ring of balls 26 (shown in FIG. 3) is mounted on the base of the support 12 in an annular channel 28, concentrically with the aperture 20. The balls 26 are spaced about the circumference of a circle at 7½° intervals. Three seating members, in the form of radially extending cylindrical rollers 30 (also shown in plan view in FIG. 4) are mounted in the upper planar surface 32 of the rotor 14, at points equally spaced about the axis 16. Thus, when the support 12 and rotor 14 are urged into contact with each other (by a mechanism which 'locks' the head 10, and which will be described subsequently), each of the rollers 30 seats in a cleft defined by the convergent surfaces of an adjacent pair of balls 26. The rotor 14 is thus kinematically supported with respect to the support 12. The ring of balls 26 provides forty eight such kinematic locations, and therefore forty eight discrete and repeatable orientations of the support 12 and rotor 14. Rotation of the rotor 14 relative to the support 12 (when the support 12 and rotor 14 are disengaged from each other), is provided for by the shaft 18 situated inside the aperture 20. The diameter of shaft 18 and aperture 20 should be chosen so that the aperture acts as a guide for the shaft when the rotor 14 is moving between kinematic locations, but should be large enough to enable the kinematic seating mechanism to dominate the relative position of the rotor 14 and support 12.

Three locating members in the form of pistons 34 are provided in the body of the rotor 14, spaced inbetween the rollers 30. The pistons 34 lie in bores 36, and are biased toward the support 12 by springs 38. The ends of the pistons 34 remote from the springs 38 have chiseled angular faces 40, which engage the convergent surfaces of adjacent pairs of balls 26. The springs 38 and pistons 34 act to bias the rotor 14 away from the support 12. Furthermore, the pistons 34, by virtue of their engagement with the convergent surfaces of an adjacent pair of balls 26, prevent unwanted rotation of the rotor 14 relative to the support 12 when the head is unlocked (i.e. the rollers 30 are disengaged with the balls 26). Rotation of the rotor 14 relative to the support 12 is achieved by ratcheting the pistons 34 around the ring of balls 26 (causing a slight axial displacement of the pistons 34). By virtue of their continual engagement with balls 26, the pistons 34 perform a third function Namely, the pistons 34 ensure that upon completion of a rotation of the rotor 14 relative to the support 12, the rollers 30 always lie in register with the convergent surfaces of an adjacent pair of balls 26 rather than inbetween two such convergent surfaces. Any attempt to lock the (i.e. urge rotor 14 towards support 12 along axis 16) head when the rollers 30 lie adjacent a single ball, as opposed to the convergent surfaces of an adjacent pair of balls may result in damage to the head. This locating means provided by the pistons 34 prevents the possibility of such damage.

The dome shaped rotor 14 has two halves 42 enclosing a central cavity 44. A cylindrical swivel 46 is mounted in the cavity 44 for rotation about its axis 48, which is perpendicular to the axis 16 of the shaft 18, and thus forms a second rotor. The swivel 46 houses a probe 50 in a bore 52, which extends diametrically in the body of the swivel 46. In the example shown, the bore is cylindrical but may have any cross-section to suit the probes to be housed. The probe 50 is connected to the swivel 46 via a connector 54. It can be seen from FIG. 2 that the connector is recessed behind the axis 48 of the swivel 46 when the probe 50 faces downwards (i.e. its axis 51 is parallel to axis 16).

The connector 54 of this embodiment provides a mechanism for releasably mounting probe 50 to a kinematic support on the swivel 46 thereby obviating the need to re-datum a probe if the probes are changed. A rotatable catch 56 provided on the housing of probe 50 enables the locking and releasing of the probe from the connector 54 by engagement and disengagement of the probe 50 The connector 54 and catch are well known per se and are disclosed, for example, in WO85/02138. Because the connector 54 is recessed inside the probe head, in the bore 52, locking of the probe on the joint must be actuable from outside the bore and is performed by a suitable tool inserted through an aperture 58 in the swivel 46. An alternative form of connector 54 would be a screw-threaded bore.

Because the connector 54 is recessed it may prove difficult to align the probe and socket; the bore 52 may thus serve as a guiding member to guide the probe correctly onto the connector 54.

The swivel 46 is mounted inside the cavity 44 for rotation between a number of discrete kinematic locations about an axis 48. To facilitate this, as with the mounting of the rotor 14 and support 12, a ring of balls 60 is mounted on an interior wall 62 in an annular channel 64 of the cavity 44. Three cylindrical rollers 66, mounted on the exterior of the swivel 46. Each roller 66 seats in the clefts defined by the converging surfaces of an adjacent pair of balls 60.

A shaft 68, which seats in an aperture 70 in the interior wall 62 guides the motion of the swivel 46 relative to the rotor 14, when the swivel 46 is moved between kinematic locations. Three pistons 72, which lie in bores 74, are urged by springs 76 into engagement with the convergent surfaces of an adjacent pair of balls 60. The pistons 72 perform the same functions as the pistons 34 described above.

The swivel 46 is urged into kinematic engagement with interior wall 64 of rotor 14 (against the action of the pistons 72), by a right angle bracket 78, mounted for pivoting about a bearing 80, itself mounted in the opposing wall 82 of the cavity 44. The right angle bracket 78 extends around the swivel 46, and is secured to the interior wall 82 by a planar spring 84. The planar spring 84 maintains the alignment of the bracket 78, and thus the alignment of the swivel 46 relative to the aperture 70 when not kinematically engaged, while allowing relative movement of swivel 46 and bracket 78 by pivoting of the bracket 78 about bearing 80. A thrust-bearing 86, mounted on the bracket engages a pad 88 on the swivel 46, and when bracket 78 pivots about the bearing 80, the bearing the pad 88 and urges the swivel 46 into kinematic engagement with the rotor 14.

Pivoting of bracket 78 about bearing 80 is caused by retraction of tie-bar 90, pivotally mounted to the bracket 78, and which extends substantially coaxially along the interior of shaft 18, and into cavity 24. The tie-bar 90 terminates at its free end with a bearing ball 92. A pivoting mechanism 94, housed inside cavity 24, comprises a vertically extending post 96, pivotally connected at its free end to a cross-bar 98; the free end of cross-bar 98 terminates in a cylindrical bearing 100 mounted for limited pivoting at the end of the cross-bar 98. The tie-bar 90 extends through an aperture in cross-bar 98 and the bearing ball 92 retains the tie-bar 90 in engagement with cross-bar 98. A planar spring 102 is connected at one end to the cross-bar 98, and at the other to the support 12, thus enabling a limited movement of the cross-bar 98 while still retaining a desired predetermined alignment of the cross-bar 98 relative to the shaft 18. A cam 104 is mounted on a shaft 106 which extends through the wall of the support 12 and is rotatable by a wheel 108. The cam 104 engages the cylindrical bearing 100, and manual rotation of the wheel 108 causes the cross-bar 98 to pivot about its pivoting support.

Thus, to move the rotor 14 and swivel 46 relative to the support 12 and each other, the cam 104 is rotated so as to allow the cross-bar 98 to pivot toward aperture 20. The pivoting of cross-bar 98 will also allow a corresponding downward movement of tie-bar 90. This will allow the bracket 78 to pivot anti-clockwise about pivot 80, thereby . removing the axial force on swivel 46 which causes kinematic engagement of swivel 46 with rotor 14. Biasing means in the form of the pistons 72 will urge the swivel 46 out of kinematic engagement with the rotor 14, and therefore enable the adjustment of the relative position of the swivel 46 and rotor 14. The downward movement of the tie-bar 90 in combination with the forces from the pistons 34 and the force of gravity, will also cause disengagement of the rotor 14 from the support 12, and thereby enable an adjustment to be made to the relative position of these two parts. Upon adjustment of the relative position of support 12, rotor 14 and swivel 46 to a new desired position, the cam 104 is rotated so as to force the cross-bar 98 to pivot away from the aperture 20 thereby causing re-engagement of the swivel 46 with the rotor 14, and of the rotor 14 with the support 12. The support 12, rotor 14, and swivel 46 will therefore once again be in kinematic engagement.

In an alternative form of the present invention, the swivel 46 may be mounted for continuous rotation relative to rotor 14. The swivel 46 could then be mounted to the outside of rotor 14, and the connector could, if desired be mounted to the outside of the swivel rather than inside the probe head. The connector would still however be positioned such that when the probe axis 57 was parallel with axis 16 the connector lies closer to the support than axis.

Figure 5:
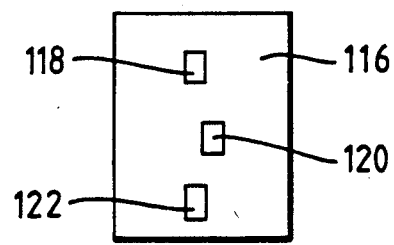
FIG. 5 is a plan view of a part of the probe head FIGS. 1 to 4.
Figure 2:
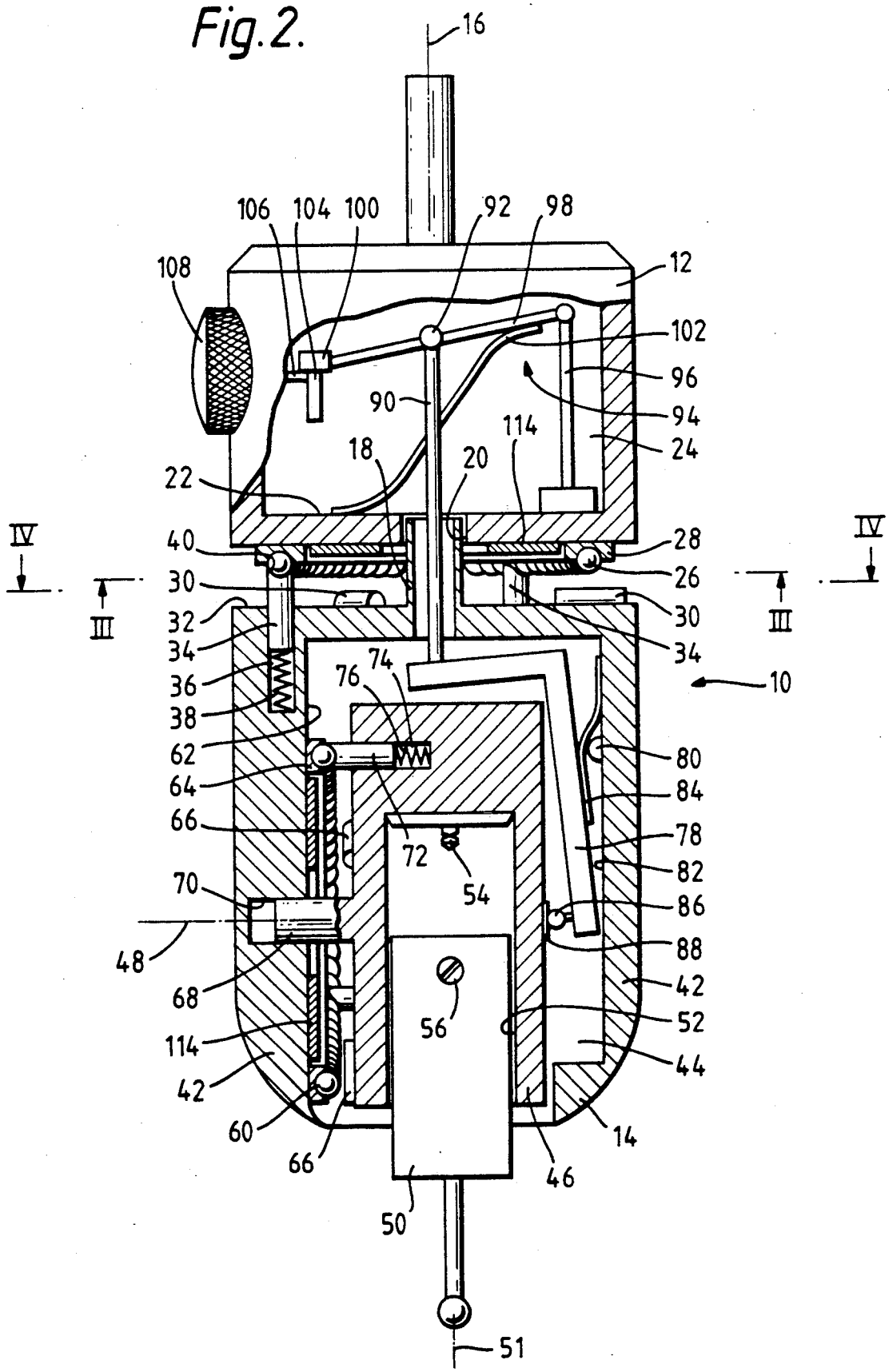
FIG. 2 is a section on II—II in FIG. 1.
Figure 3:
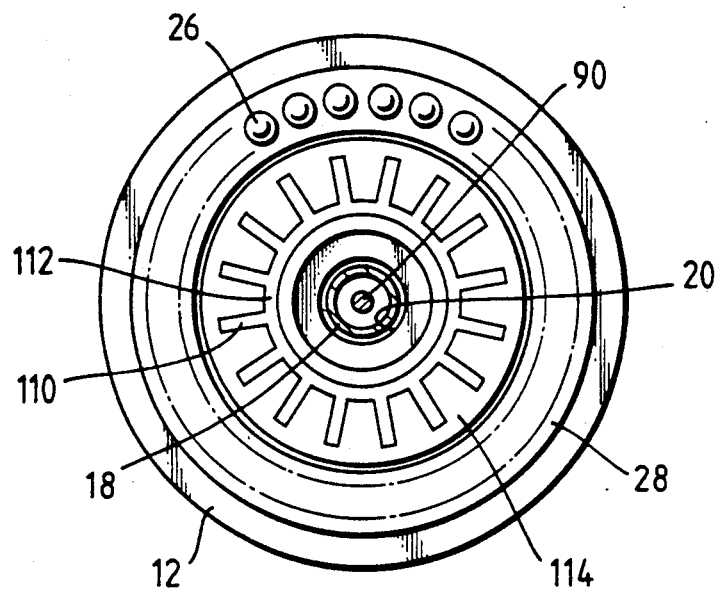
FIG. 3 is a section on III—III in FIG. 2.
Figure 4:
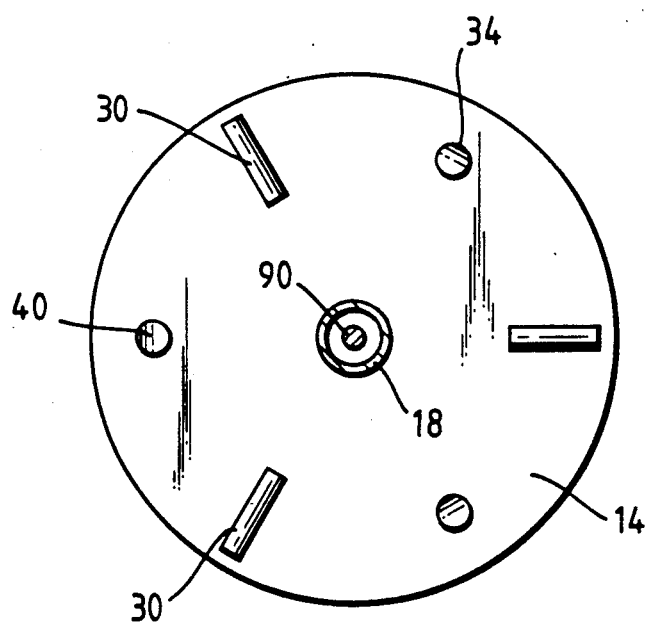
FIG. 4 is a section on IV—IV in FIG. 2.

In order to ascertain the relative positions of swivel 46 and rotor 14, a wiper mechanism is provided on each of the exterior of rotor 14 and swivel 46. A part of the wiper mechanism is shown in plan view in FIG. 3, and comprises a ring of radially extending electrical contacts 110 and a circumferential common contact 112, all mounted on a printed circuit board 114. The printed circuit boards 114 are mounted concentrically with the annular channels 28 and 64 on the support 12 and rotor 14 respectively A contact arm 116 (not shown in FIGS. 1 to 4 but illustrated in FIG. 5) is mounted in register with each printed circuit board 114 on the upper surface 32 of the support and the exterior of the swivel 46, for rotation over the printed circuited boards 114. Each contact arm 116 carries three electrical contacts 118 to 122. The electrical contacts 118 and 120 are positioned for electrical connection with radially extending electrical contacts 110 on the printed circuit board 114; the electrical contact 122 is mounted for connection with common electrical contact. Contacts 118 and 120 are each at a positive voltage provided by a battery (not shown) and the contact arm 116 is connected to an incremental counting mechanism (not shown), which increments a count every time the circuit between contacts 118, 120 and common contact 122 is completed and a pulse is emitted from the contact arm 116. The counting mechanism may provide on a display, an indication of the relative position of e.g. swivel 36 and rotor 14. The contacts 118 and 120 are offset from each other so that they form a circuit with the radial contacts 110, and common contact 122 at different angular positions of rotor 14 and swivel 46. By detecting which contact 118 and 120 comes into contact with the radial contacts 110 first during rotation of rotor 14 and swivel 46, an indication of both position and direction of movement of the motor 14 and swivel 46 can be obtained.

The circuit boards 114 should be orientated so that the electrical contacts 118 and 120 are not in contact with radial contacts 110 when the rotor 14 and swivel 46 are kinematically supported; this saves battery life.

The outputs of both such wiper mechanisms may be connected to a microprocessor which processes the incremental count and generates position and relative direction data on an LCD display so that the operator can determine instantly the orientation of the probe.

Instead of a wiper mechanism the pistons 34 and 72 may be used to provide an incremental count. In this alternative each downward movement of a piston as it passes over a ball (26 or 60) causes it to complete an electrical circuit and consequently emit an electrical pulse. To obtain directional information, one of the pistons would be slightly offset from the convergent surfaces of an adjacent pair of balls relative to the other two.

I claim:

1. A probe head for orienting a probe relative to a head of a coordinate positioning machine, comprising:
    a support for connection to the head of the machine;
    a first rotor mounted to the support, and for rotation relative to the support about a first axis;
    a second rotor mounted to the first rotor for rotation with the first rotor about the first axis, and for rotation relative to the first rotor about a second axis, the second axis being substantially perpendicular to the first axis;
    the second rotor carrying a connector onto which the probe is directly mountable, the probe having an axis; wherein
    when the relative orientation of the first and second rotors is such that said probe is directed away from said support and has its axis parallel to the first axis, the distance between a point of attachment of the probe to the connector and the support is smaller than the distance between the second axis and the support; and
    wherein a plane of rotation of the probe about the second axis is coplanar with the first axis.

2. A manually operable probe head, mountable to a quill of a coordinate positioning machine, for orienting a probe relative to the quill, the probe head comprising:
    a support for connection to the quill;
    a first rotor for supporting a probe, the first rotor being mounted to the support;
    means for providing rotation of the first rotor relative to the support about a first axis;
    primary indexing means for providing a plurality of repeatable rest locations, each of said plurality of repeatable rest locations being provided at a discrete angular orientation about said first axis of said rotor on said support;

locking means for locking said first rotor into and unlocking said first rotor out of, each of said plurality of repeatable rest locations; and secondary indexing means for positioning said first rotor in a plurality of discrete adjacent locations, each adjacent location being adjacent a corresponding rest location when said first rotor and support are unlocked, said first rotor being rotatable between said adjacent location when unlocked.

3. A probe head according to claim 2, wherein:

the primary indexing means comprises a plurality of pairs of convergent surfaces provided on one of the first rotor and the support, the convergent surfaces being spaced circumferentially with respect to said first axis, and a plurality of seating members provided on the other of the first rotor and the support, each seating member for seating in a corresponding pair of said plurality of pairs of convergent surfaces to define one of said plurality of repeatable rest locations; and the locking means comprises biasing means providing an axial releasing force on the first rotor to bias each of said seating members out of seating in the corresponding pair of convergent surfaces, engaging means providing an axial engaging force on the first rotor which is greater than, and acts in opposition to said releasing force, to urge each of said seating members into seating in a corresponding pair of convergent surfaces, and actuating means for actuating said engaging means to apply said engaging force.

4. A probe head according to claim 3, wherein the secondary indexing means comprises:

a plurality of locating members provided on the other of the first rotor and the support, each locating member for seating in a corresponding pair of said plurality of pairs of convergent surfaces; and wherein said biasing means acts between the other of the first rotor and the support and each said locating member, and is also for resiliently biasing each said locating member into seating in said corresponding pair of convergent surfaces, thereby enabling displacement of the locating members by the convergent surfaces as a consequence of relative rotation of the first rotor and the support when said engaging means is not actuated.

5. A probe head according to claim 4, wherein the convergent surfaces are provided by a ring of balls concentrically mounted with the first axis, wherein the seating members are provided by three equispaced rollers extending radially relative to the first axis, and wherein the locating members are provided by three pistons each having a longitudinal direction extending parallel to the first axis.

6. A probe head according to claim 5 wherein the ends of the pistons adjacent the convergent surfaces have chiseled faces.

7. A probe head according to claim 4 comprising:

a second rotor, mounted for rotation with the first rotor about said first axis, and for rotation relative to the first rotor about a second axis, the second axis being at an angle to the first axis;

second rotor primary indexing means for providing a plurality of repeatable second rotor rest locations, each of said plurality of repeatable second rotor rest locations being provided at a discrete angular orientation about the second axis of said second rotor on said first rotor;

second rotor locking means for locking the second rotor into and unlocking the second rotor out of each of said plurality of repeatable second rotor rest locations of said second rotor on said first rotor; and second rotor secondary indexing means for positioning the second rotor in a plurality of discrete second rotor adjacent locations, each second rotor adjacent location being adjacent a corresponding second rotor rest location when the first and the second rotors are unlocked, said second rotor being rotatable between said second rotor adjacent locations when unlocked.

8. A probe head according to claim 2 wherein at each of said plurality of repeatable rest locations the first rotor is kinematically supported on the support.

* * * * *